United States Patent
Yang et al.

(10) Patent No.: US 10,162,227 B2
(45) Date of Patent: Dec. 25, 2018

(54) LIQUID CRYSTAL GRATING AND CONTROL METHOD THEREOF, 3D TOUCH DISPLAY PANEL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN); Lu Tian, Beijing (CN); Jinming Yao, Beijing (CN); Kai Yuan, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 210 days.

(21) Appl. No.: 15/160,175

(22) Filed: May 20, 2016

(65) Prior Publication Data
US 2016/0377939 A1 Dec. 29, 2016

(30) Foreign Application Priority Data
Jun. 26, 2015 (CN) .......................... 2015 1 0364627

(51) Int. Cl.
*G02F 1/1343* (2006.01)
*G06F 3/044* (2006.01)
(Continued)

(52) U.S. Cl.
CPC ........ *G02F 1/134309* (2013.01); *G02F 1/292* (2013.01); *G06F 3/044* (2013.01); *G02B 27/2214* (2013.01); *G06F 2203/04108* (2013.01)

(58) Field of Classification Search
CPC .............. G02F 1/292; G02F 1/134309; G02B 27/2214; G06F 3/044; G06F 3/0418
(Continued)

(56) References Cited

U.S. PATENT DOCUMENTS 9,405,144 B2 8/2016 Yang
9,690,409 B2 6/2017 Yang et al.
(Continued)

FOREIGN PATENT DOCUMENTS

CN 101609178 * 12/2009
CN 103309094 A 9/2013
(Continued)

OTHER PUBLICATIONS

Chinese Office Action in Chinese Application No. 201510364627.X, dated May 19, 2017 with English translation.

*Primary Examiner* — Hoan C Nguyen
(74) *Attorney, Agent, or Firm* — Collard & Roe, P.C.

(57) ABSTRACT

Embodiments of the present invention relate to a liquid crystal grating and a control method thereof, and a 3D touch display panel. The liquid crystal grating, comprises: upper and lower substrates; a liquid crystal layer, arranged between the two substrates; a plurality of strip-shaped electrode groups, parallel to each other and arranged side by side, and formed on a surface of the upper substrate facing the liquid crystal layer, each of the electrode groups including first and second comb-shaped touch electrodes separated by a strip-shaped region, comb teeth of the first and second touch electrodes being opposite to each other, and an
(Continued)

included angle between extending directions of the strip-shaped region and the electrode group being an acute angle; first and second comb-shaped grating electrodes, formed on a surface of the lower substrate facing the liquid crystal layer, the first and second grating electrodes being arranged in an interdigital shape.

10 Claims, 11 Drawing Sheets

(51) Int. Cl.
  *G02F 1/29* (2006.01)
  *G02B 27/22* (2018.01)
(58) Field of Classification Search
  USPC .............................................. 345/173; 349/12
  See application file for complete search history.

(56) References Cited

U.S. PATENT DOCUMENTS

| | | | |
|---|---|---|---|
| 2007/0279395 A1* | 12/2007 | Philipp | G06F 3/044 345/173 |
| 2011/0242031 A1 | 10/2011 | Cheng et al. | |
| 2015/0160495 A1* | 6/2015 | Yang | G02B 27/2264 349/12 |
| 2016/0216811 A1* | 7/2016 | Yang | G06F 3/0412 |

FOREIGN PATENT DOCUMENTS

| | | |
|---|---|---|
| CN | 203480490 U | 3/2014 |
| CN | 104123038 A | 10/2014 |
| WO | 2010/109170 A1 | 9/2010 |

* cited by examiner

LIQUID CRYSTAL GRATING AND CONTROL METHOD THEREOF, 3D TOUCH DISPLAY PANEL

CROSS REFERENCE TO RELATED APPLICATIONS

Applicant claims priority under 35 U.S.C. § 119 of Chinese Application No. 201510364627.X filed on Jun. 26, 2015, the disclosure of which is incorporated by reference.

TECHNICAL FIELD

Embodiments of the present disclosure relate to a liquid crystal grating and a control method thereof, and a 3D touch display panel.

BACKGROUND

At present, with continuous development of a liquid crystal display technology, a Three-Dimensional (3D) display technology has attracted more attention; the 3D display technology may make an image tridimensional and vividly, and a basic principle thereof is that different images are respectively received by left and right eyes of a person, and then image information is superimposed and regenerated by a brain, and thus a real 3D effect for the eyes is simulated.

In the 3D display technology, a 3D technology of a naked eye barrier type may be compatible with a Liquid Crystal Display (LCD) process, so that there are advantages in mass production and cost. Based on functional requirements on current 3D product and touch application product, an integrated product of the two is also concerned by many module manufacturers. An existing 3D touch display product often adopts a structure combining a 3D display module and an Out Cell Touch (OCT), and includes a touch module, a grating module and a display module which are superimposed together, and the touch module is an out cell touch, and therefore, in the prior art the 3D touch display panel has a large thickness, resulting in a low transmittance.

SUMMARY

Embodiments of the present invention relate to a liquid crystal grating and a control method thereof, and a 3D touch display panel, which can reduce a thickness of the 3D touch display panel and improves a transmittance.

In one aspect, an embodiment of the present invention provides a liquid crystal grating, comprising: an upper substrate; a lower substrate; a liquid crystal layer, arranged between the upper substrate and the lower substrate; a plurality of electrode groups which are strip-shaped, parallel to each other and arranged side by side, and formed on a surface of the upper substrate facing the liquid crystal layer, each of the electrode groups including a first touch electrode and a second touch electrode which are comb-shaped and separated by a strip-shaped region, comb teeth of the first touch electrode and the second touch electrode being opposite to each other, and an included angle between an extending direction of the strip-shaped region and an extending direction of the electrode group being an acute angle; a first grating electrode and a second grating electrode which are comb-shaped, formed on a surface of the lower substrate facing the liquid crystal layer, the first grating electrode and the second grating electrode being arranged in an interdigital shape.

In another aspect, an embodiment of the present invention provides a 3D touch display panel, comprising: a liquid crystal panel; a liquid crystal grating as mentioned above, arranged in a light exiting direction of the liquid crystal panel and adhered to the liquid crystal panel through an optical adhesive; and, an upper polarizer and a protective cover plate arranged in the light exiting direction of the liquid crystal panel, sequentially, and a lower polarizer arranged between the liquid crystal grating and the liquid crystal panel.

In still another aspect, an embodiment of the present invention provides a control method of a liquid crystal grating as mentioned above, comprising: when a 3D touch display panel comprising the liquid crystal grating operates in a landscape 3D display, grounding the first grating electrode and the second grating electrode on the lower substrate, and inputting direct current voltage to the first touch electrode and the second touch electrode on the upper substrate, so as to form a transverse black and white barrier; when a 3D touch display panel comprising the liquid crystal grating operates in a portrait 3D display, grounding the first grating electrode on the lower substrate, inputting direct current voltage to the second grating electrode, and grounding the first touch electrode and the second touch electrode on the upper substrate, so as to form a longitudinal black and white barrier; when a 3D touch display panel of the liquid crystal grating is used to realize a touch function, grounding the first grating electrode and the second grating electrode on the lower substrate, and receiving touch detection signals by the first touch electrode and the second touch electrode on the upper substrate, to sense a finger touch position in a manner of self-capacitive touch; and when a 3D touch display panel of the liquid crystal grating operates in a 2D display, grounding all of the first grating electrode, the second grating electrode, the first touch electrode and the second touch electrode.

In still another aspect, an embodiment of the present invention provides a control method of a liquid crystal grating as mentioned above, comprising: when a 3D touch display panel comprising the liquid crystal grating operates in a landscape 3D display, grounding the first grating electrode and the second grating electrode on the lower substrate, and inputting direct current voltage to the first touch electrode and the second touch electrode on the upper substrate, grounding the floating electrode, so as to form a transverse black and white barrier; when a 3D touch display panel comprising the liquid crystal grating operates in a portrait 3D display, grounding the first grating electrode on the lower substrate, inputting direct current voltage to the second grating electrode, grounding the first touch electrode and the second touch electrode on the upper substrate, grounding the floating electrode, so as to form a longitudinal black and white barrier; when a 3D touch display panel comprising the liquid crystal grating is used to realize a touch function, grounding the first grating electrode and the second grating electrode on the lower substrate, receiving touch detection signals by the first touch electrode and the second touch electrode on the upper substrate, floating the floating electrode, to sense a finger touch position in a manner of self-capacitive touch; and when a 3D touch display panel comprising the liquid crystal grating operates in a 2D display, grounding all of the first grating electrode, the second grating electrode, the first touch electrode, the second touch electrode and the floating electrode.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

The implementations of the embodiments of the present disclosure shall be described in detail hereinafter in conjunction with the accompanying drawings of the specification. It should be noted that, same or similar reference signs denote same or similar parts or parts having same or similar functions throughout the description. The embodiments described by referring the accompanying drawings are exemplary, which is only for explaining the present disclosure, but cannot be understood as limitation to the present disclosure.

Embodiment I

Figure 1:
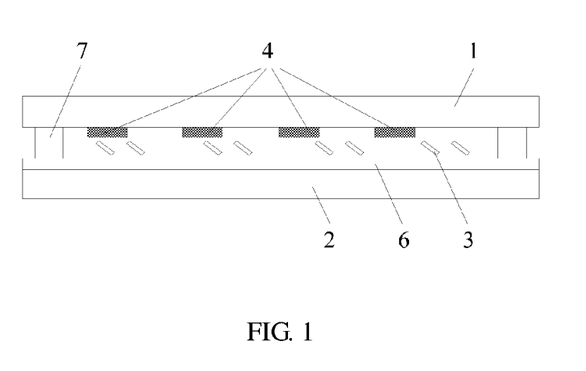
FIG. 1 is a cross-sectional structural schematic diagram of a first type liquid crystal grating provided by an embodiment of the present disclosure.
Figure 2:
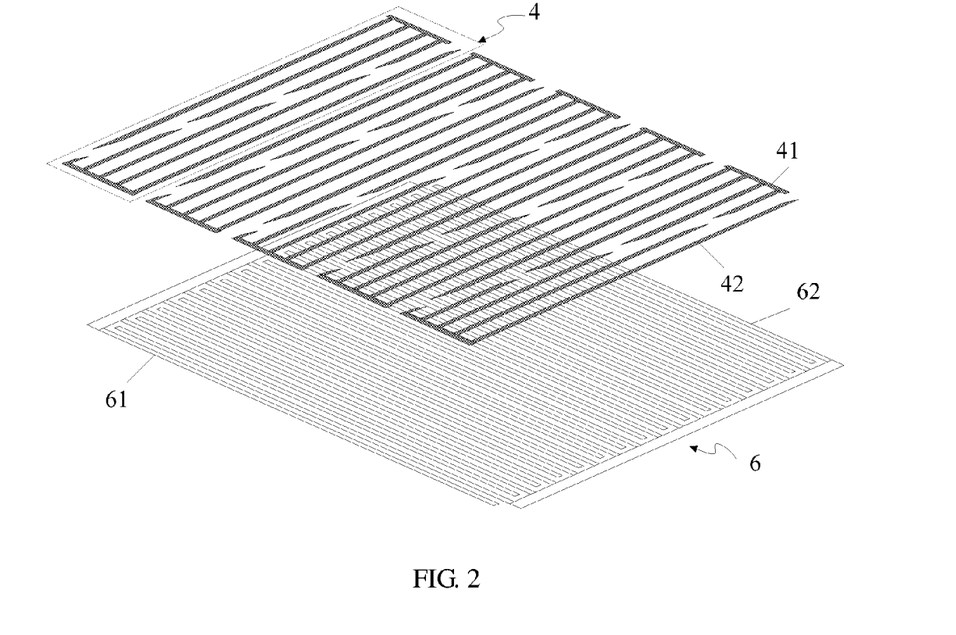
FIG. 2 is a position structural schematic diagram of a grating electrode and an electrode group in the first type liquid crystal grating provided by the embodiment of the present disclosure.
Figure 4:
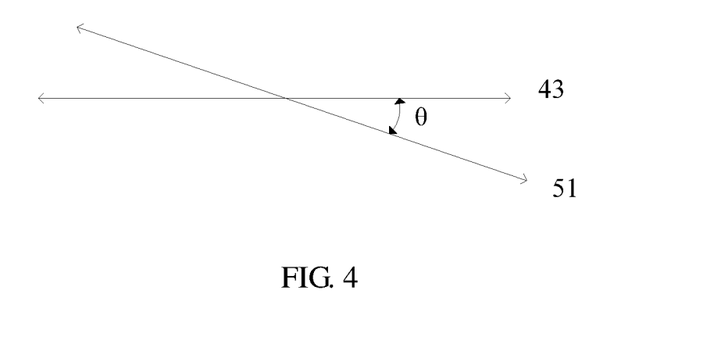
FIG. 4 is a schematic diagram of an included angle between an extending direction of a strip-shaped region and an extending direction of the electrode group in the electrode group shown in FIG. 3.
Figure 5:
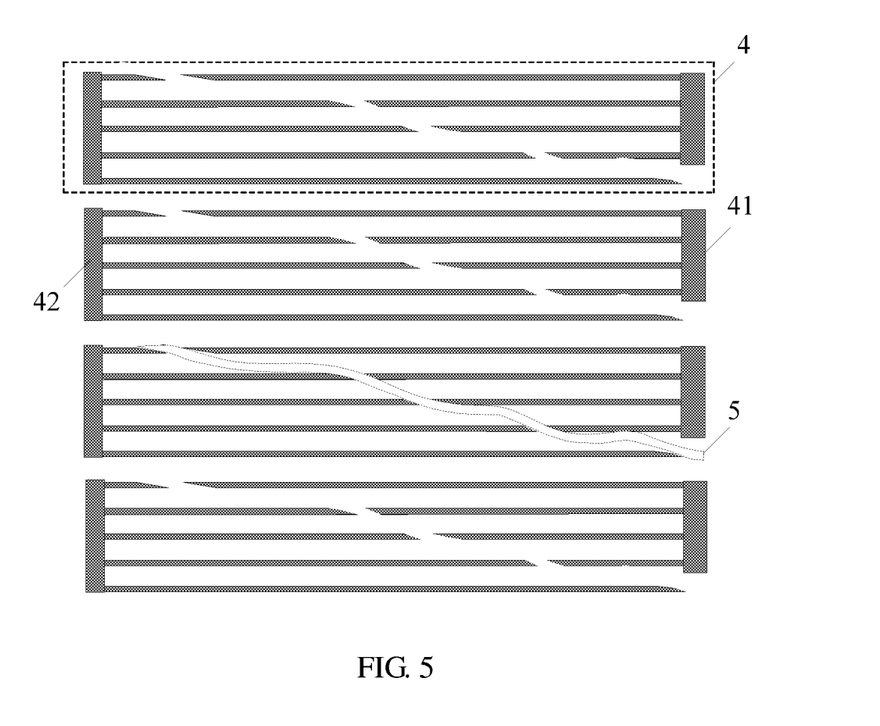
FIG. 5 is a top-view structural schematic diagram of an electrode group having a strip-shaped region of a curve type provided by the embodiment of the present disclosure.

Referring to FIG. 1, an embodiment of the present disclosure provides a first type liquid crystal grating 101, comprising an upper substrate 1, a lower substrate 2, and a liquid crystal layer 3 arranged between the upper substrate 1 and the lower substrate 3; and the liquid crystal grating 101 further comprises:

A plurality of electrode groups 4 which are strip-shaped, arranged at intervals, parallel to each other and arranged side by side, and formed on a surface of the upper substrate 1 facing the liquid crystal layer 3. As shown in FIG. 2, the electrode group 4 includes a first touch electrode 41 and a second touch electrode 42 which are comb-shaped and separated by a strip-shaped region 5 (referring to FIG. 3 and FIG. 5), and comb teeth of the first touch electrode 41 and the second touch electrode 42 are opposite to each other; wherein, as shown in FIG. 4, an included angle θ between an extending direction 51 of the strip-shaped region 5 and an extending direction 43 of the electrode group 4 is an acute angle.

Exemplarily, the upper substrate 1 and the lower substrate 2 are bonded by a sealant 7, which will not be repeated here.

Figure 6:
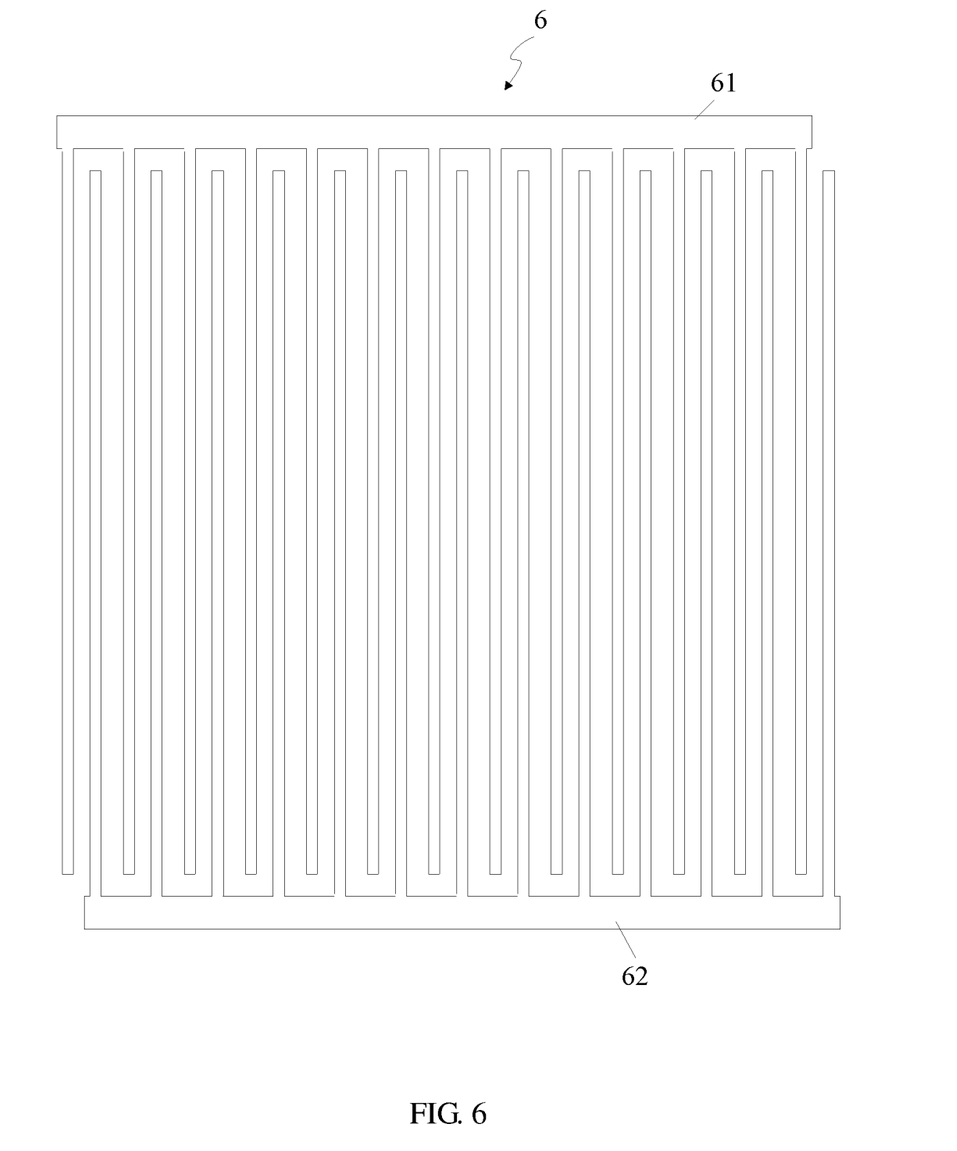
FIG. 6 is a top-view structural schematic diagram of the grating electrode provided by the embodiment of the present disclosure.

As shown in FIG. 6, a grating electrode 6 is formed on a surface of the lower substrate 2 facing the liquid crystal layer 3; the grating electrode 6 includes a first grating electrode 61 and a second grating electrode 62 which are comb-shaped and insulated from each other, and the first grating electrode 61 and the second grating electrode 62 are arranged in an interdigital shape.

In the embodiment, in the liquid crystal grating 101, a self-inductive touch electrode (e.g., the first touch electrode 41 and the second touch electrode 42) is formed on a surface of the upper substrate 1 facing the liquid crystal layer 3, the grating electrode 6 (e.g., the first grating electrode 61 and the second grating electrode 62) is formed on a side of the lower substrate 2 facing the liquid crystal layer 3, so that the liquid crystal grating 101 is integrated with a touch function; when the liquid crystal grating 101 is applied to a 3D touch display panel, it is not necessary to arrange a touch panel separately, so that a thickness of the 3D touch display panel is reduced, and a transmittance is improved.

Pitches of any two comb teeth of each of the first touch electrodes 41 may be equal or not; similarly, pitches of any two comb teeth of each of the second touch electrodes 42 may be equal or not. Of course, considering a factor of simple and united design, the pitches of the any two comb teeth of each of the first touch electrodes 41 may be equal, and the pitches of the any two comb teeth of each of the second touch electrodes 42 may be equal. Accordingly, part or all of the comb teeth of the first touch electrode 41 and the second touch electrode 42 may correspond to each other, and the comb teeth of the first touch electrode 41 and the second touch electrode 42 corresponding to each other are in a same straight line, in this way, it is more conducive to analyzing a touch position sensed by the first touch electrode 41 and the second touch electrode 42 in a following steps.

Figure 3:
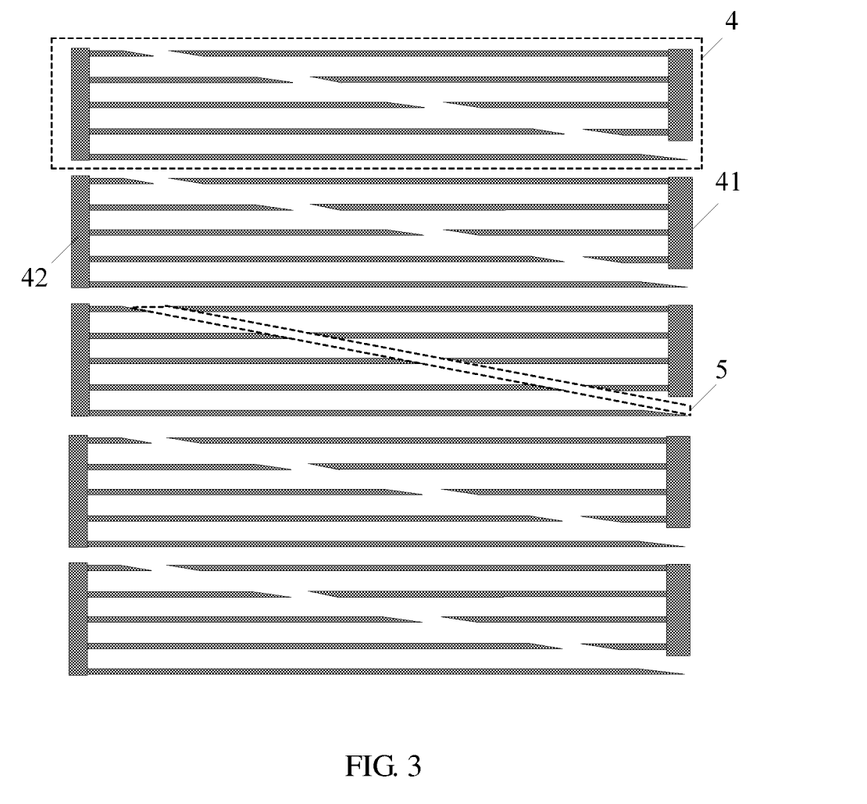
FIG. 3 is a top-view structural schematic diagram of the electrode group in the first type liquid crystal grating provided by the embodiment of the present disclosure.

In the electrode group 4 shown in FIG. 3, the strip-shaped region 5 is of a straight line type. It should be noted that, what is shown in FIG. 3 is only for describing the embodiment of the present disclosure; in the embodiment of the present disclosure, the strip-shaped region 5 may be of a curve type or a polygonal line type, as long as an included angle θ between an extending direction 51 thereof and an extending direction 43 of the electrode group 4 is an acute angle. For example, in the electrode group 4 shown in FIG. 5, the strip-shaped region 5 is of a curve type.

Exemplarily, when the strip-shaped region 5 is of a straight line type, patterns of vertical projections of the first touch electrode 41 and the second touch electrode 42 on the upper substrate 1 are of triangle or trapezoid, for example, profiles of vertical projections on the upper substrate 1 are of triangle or trapezoid.

By forming the plurality of electrode groups 4 including the first touch electrode 41 and the second touch electrode 42 on the upper substrate 1, the liquid crystal grating 101 has a self-inductive capacitive touch function, so that it is not necessary to externally connect a touch panel to the liquid crystal grating 101; when the liquid crystal grating 101 is applied to a 3D display panel, thinness and lightness may be realized, and thus a transmittance is improved.

Based on the liquid crystal grating 101 (referring to FIG. 2) provided by the embodiment of the present disclosure, an embodiment of the present disclosure further provides a control method of the liquid crystal grating 101, comprising:

When a 3D touch display panel comprising the liquid crystal grating 101 is in a landscape 3D display, the first grating electrode 61 and the second grating electrode 62 on the lower substrate 2 are grounded, and inputting a direct current voltage to the first touch electrode 41 and the second touch electrode 42 on the upper substrate 1, so as to form a transverse black and white barrier; here, when the 3D touch display panel is in the landscape 3D display, a left-eye image and a right-eye image are alternately displayed along a longitudinal direction;

When a 3D touch display panel comprising the liquid crystal grating 101 is in a portrait 3D display, grounding the first grating electrode 61 on the lower substrate 2, inputting a direct current voltage to the second grating electrode 62, and grounding the first touch electrode 41 and the second touch electrode 42 on the upper substrate 1, so as to form a longitudinal black and white barrier; here, when the 3D touch display panel performs the portrait 3D display, a left-eye image and a right-eye image are alternately displayed along a transverse direction;

When the 3D touch display panel comprising the liquid crystal grating 101 is used to realize a touch function, grounding the first grating electrode 61 and the second grating electrode 62 on the lower substrate 2, and receiving touch detection signals by the first touch electrode 41 and the second touch electrode 42 on the upper substrate 1, to sense a finger touch position in a manner of self-capacitive touch;

When the 3D touch display panel comprising the liquid crystal grating 101 is in a 2D display, grounding all of the first grating electrode 61, the second grating electrode 62, the first touch electrode 41 and the second touch electrode 42.

Figure 7:
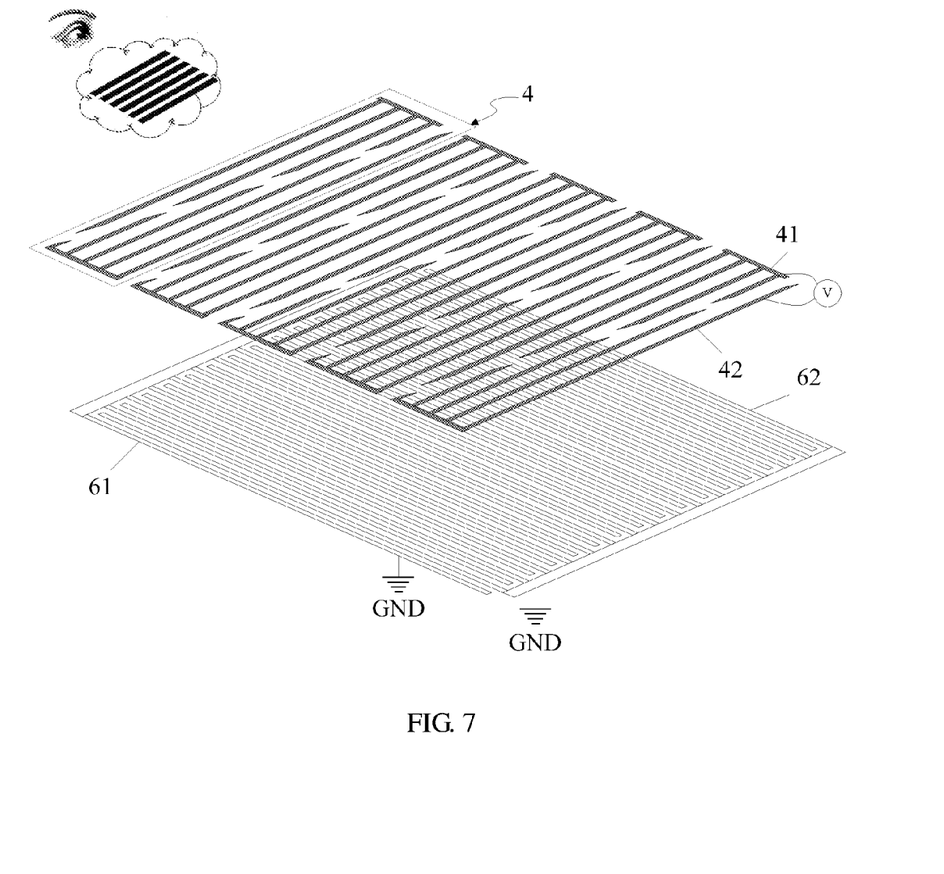
FIG. 7 is a schematic diagram of applying the first type liquid crystal grating provided by the embodiment of the present disclosure to a landscape 3D display.

In order to more clearly describe the control method of the liquid crystal grating 101, it is described in conjunction with FIG. 7 to FIG. 9 in the following:

As shown in FIG. 7, when the 3D touch display panel comprising the liquid crystal grating 101 is in a landscape 3D display, the first grating electrode 61 and the second grating electrode 62 on the lower substrate 2 are grounded GND, a direct current voltage V (e.g., a direct current common voltage) is input to the first touch electrode 41 and the second touch electrode 42 on the upper substrate 1, and thus an electric field is formed between the touch electrode (e.g., the first touch electrode 41 and the second touch electrode 42) and the grating electrode 6 (e.g., the first grating electrode 61 and the second grating electrode 62), the liquid crystal layer 3 located between the upper substrate 1 and the lower substrate 2 deflects with respect to an original state as the presence of the electric field, a region where the electric field is vertically distributed may form a black region, to form a transverse black and white barrier, and the landscape 3D display may be realized by combining a display module.

Figure 8:
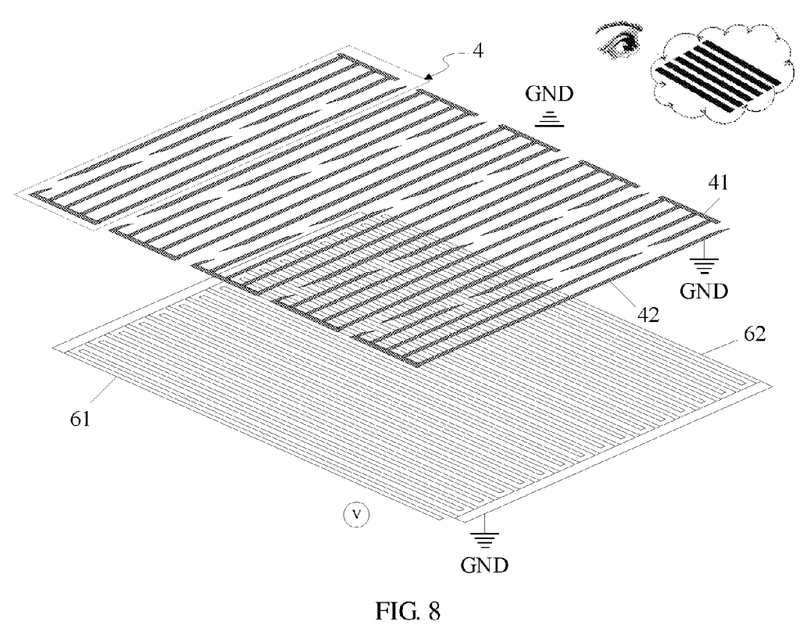
FIG. 8 is a schematic diagram of applying the first type liquid crystal grating provided by the embodiment of the present disclosure to a portrait 3D display.

As shown in FIG. 8, when the 3D touch display panel comprising the liquid crystal grating 101 is in the portrait 3D display, the first grating electrode 61 on the lower substrate 2 is grounded GND, a direct current voltage V (e.g., a direct current common voltage) is input to the second grating electrode 62, the first touch electrode 41 and the second touch electrode 42 on the upper substrate 1 are grounded, and thus an electric field is formed between the touch electrode (e.g., the first touch electrode 41 and the second touch electrode 42) and the grating electrode 6 (e.g., the first grating electrode 61 and the second grating electrode 62), the liquid crystal layer 3 located between the upper substrate 1 and the lower substrate 2 deflects with respect to an original state as the presence of the electric field, a region where the electric field is vertically distributed may form a black region, to form a longitudinal black and white barrier, and the portrait 3D display may be realized by combining a display module.

Figure 9:
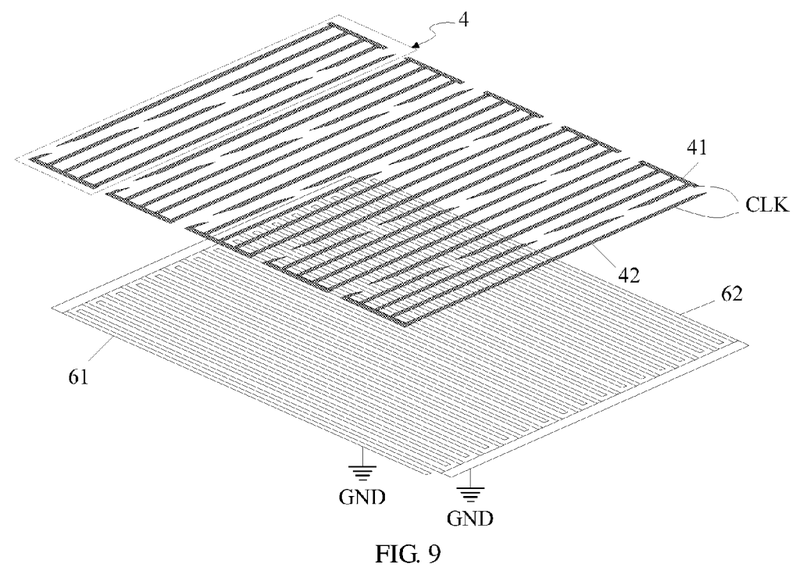
FIG. 9 is a schematic diagram of applying the first type liquid crystal grating provided by the embodiment of the present disclosure to touch.

As shown in FIG. 9, when the 3D touch display panel comprising the liquid crystal grating 101 is used to realize a touch function, the first grating electrode 61 and the second grating electrode 62 on the lower substrate 2 are grounded GND, touch detection signals CLK are received by the first touch electrode 41 and the second touch electrode 42 on the upper substrate 1, to sense a finger touch position in a manner of self-capacitive touch.

In addition, when the 3D touch display panel comprising the liquid crystal grating 101 is in the 2D display, it is only necessary to ground all of the first grating electrode 61, the second grating electrode 62, the first touch electrode 41 and the second touch electrode 42, which will not be repeated here.

Advantageous effects of an embodiment of the present disclosure are as follows: in the liquid crystal grating 101, a self-inductive touch electrode (e.g., the first touch electrode 41 and the second touch electrode 42) is formed on a surface of the upper substrate 1 facing the liquid crystal layer 3, a grating electrode 6 (e.g., the first grating electrode 61 and the second grating electrode 62) is formed on a surface of the lower substrate 2 facing the liquid crystal layer 3, so that the liquid crystal grating 101 is integrated with a touch function; when the liquid crystal grating 101 is applied to a 3D touch display panel, it is not necessary to arrange a touch panel separately, so that a thickness of the 3D touch display panel is reduced, and a transmittance is improved.

Embodiment II

Figure 10:
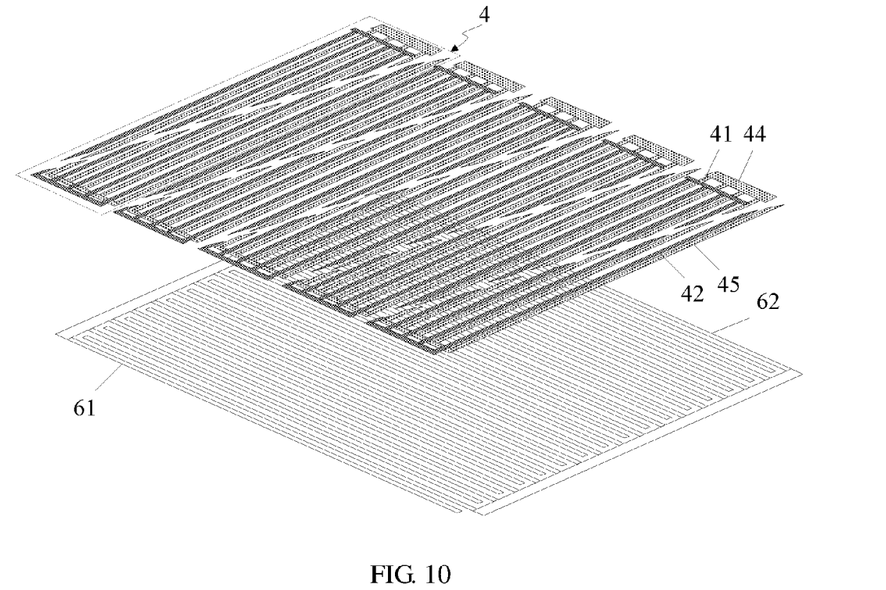
FIG. 10 is a position structural schematic diagram of a grating electrode and an electrode group in a second type liquid crystal grating provided by an embodiment of the present disclosure.

Referring to FIG. 10, there is shown a position structural schematic diagram of a grating electrode and an electrode group 4 in a second type liquid crystal grating 102 provided by an embodiment of the present disclosure; a difference from the liquid crystal grating 101 provided by Embodiment I is that, the electrode group 4 further includes a floating electrode located on a same layer with the first touch electrode 41 and the second touch electrode 42, and the floating electrode includes a first floating electrode 44 and a second floating electrode 45 which are comb-shaped and separated by the strip-shaped region 5;

In the same electrode group 4, the first floating electrode 44 and the first touch electrode 41 are located on a same side of the strip-shaped region 5, and comb teeth of the first floating electrode 44 and the comb teeth of the first touch electrode 41 are parallel to each other and alternately arranged;

In the same electrode group 4, the second floating electrode 45 and the second touch electrode 42 are located on a same side of the strip-shaped region 5, and comb teeth of the second floating electrode and the comb teeth of the second touch electrode are parallel to each other and alternately arranged.

In the embodiment, the electrode group 4 further includes a first floating electrode 44 and a second floating electrode 45, so as to increase a signal-to-noise ratio between the first touch electrode 41 and the second touch electrode 42, thereby improving touch sensitivity.

Figure 11:
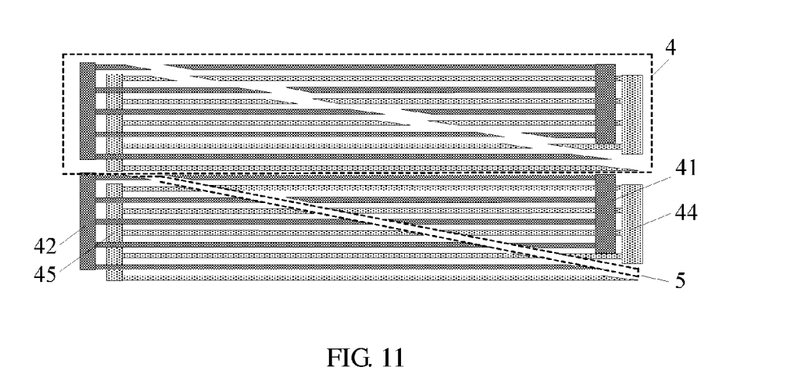
FIG. 11 is a top-view structural schematic diagram of the electrode group in the second type liquid crystal grating provided by the embodiment of the present disclosure.

Wherein, a top-view structural schematic diagram of each of the electrode groups 4 is shown in FIG. 11.

It should be noted that, the first touch electrode 41, the second touch electrode 42, the first floating electrode 44 and the second floating electrode 45 are all located in a same layer, but insulated from each other. However, in an overlapping part at ends, mutual insulation among the first touch electrode 41, the second touch electrode 42, the first floating electrode 44 and the second floating electrode 45 may be realized through a bridge or a jumping wire together with a via hole, which will not be repeated here.

Based on the liquid crystal grating 101 (referring to FIG. 10) provided by the embodiment of the present disclosure, an embodiment of the present disclosure further provides another control method of the liquid crystal grating 101, comprising:

When a 3D touch display panel comprising the liquid crystal grating 101 is in a landscape 3D display, grounding the first grating electrode 61 and the second grating electrode 62 on the lower substrate, inputting a direct current voltage to the first touch electrode 41 and the second touch electrode 42 on the upper substrate, and grounding the floating electrode (e.g., the first floating electrode 44 and the second floating electrode 45 shown in FIG. 10), so as to form a transverse black and white barrier;

When a 3D touch display panel comprising the liquid crystal grating 101 is in a portrait 3D display, grounding the first grating electrode 61 on the lower substrate, inputting a direct current voltage to the second grating electrode 62, grounding the first touch electrode 41 and the second touch electrode 42 on the upper substrate, and grounding the floating electrode (e.g., the first floating electrode 44 and the second floating electrode 45 shown in FIG. 10), so as to form a longitudinal black and white barrier;

When the 3D touch display panel comprising the liquid crystal grating 101 is used to realize a touch function, grounding the first grating electrode 61 and the second grating electrode 62 on the lower substrate, receiving touch detection signals by the first touch electrode 41 and the second touch electrode 42 on the upper substrate, and floating the floating electrode (e.g., the first floating electrode 44 and the second floating electrode 45 shown in FIG. 10), to sense a finger touch position in a manner of self-capacitive touch;

When the 3D touch display panel comprising the liquid crystal grating 101 is in a 2D display, grounding all of the first grating electrode 61, the second grating electrode 62, the first touch electrode 41, the second touch electrode 42 and the floating electrode (e.g., the first floating electrode 44 and the second floating electrode 45 shown in FIG. 10).

Figure 12:
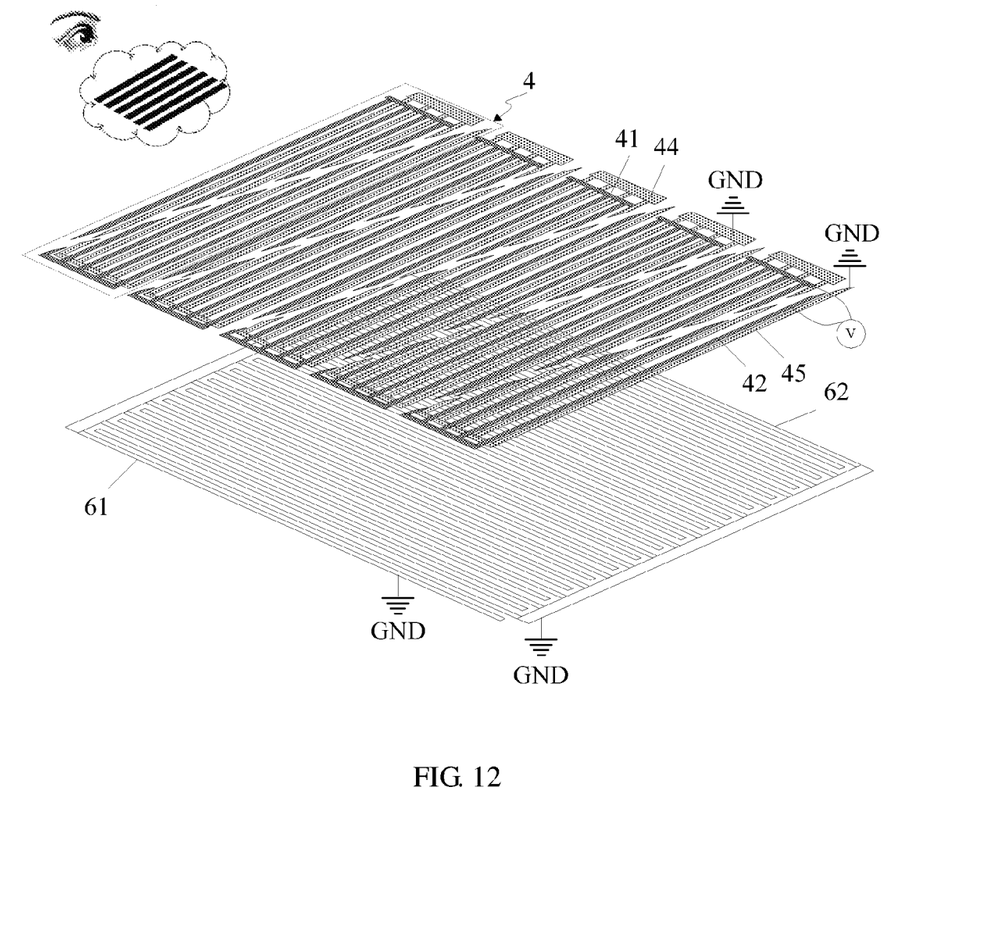
FIG. 12 is a schematic diagram of applying the second type liquid crystal grating provided by the embodiment of the present disclosure to a landscape 3D display.

In order to more clearly describe the control method of the liquid crystal grating 101, it is described in conjunction with FIG. 12 to FIG. 14 in the following:

As shown in FIG. 12, when the 3D touch display panel comprising the liquid crystal grating 101 is in a landscape 3D display, the first grating electrode 61 and the second grating electrode 62 on the lower substrate 2 are grounded GND, a direct current voltage V (e.g., a direct current common voltage) is input to the first touch electrode 41 and the second touch electrode 42 on the upper substrate 1, and thus an electric field is formed between the touch electrode (e.g., the first touch electrode 41 and the second touch electrode 42) and the grating electrode 6 (e.g., the first grating electrode 61 and the second grating electrode 62), the liquid crystal layer 3 located between the upper substrate 1 and the lower substrate 2 deflects with respect to an original state as the presence of the electric field, a region where the electric field is vertically distributed may form a black region, to form a transverse black and white barrier, and the landscape 3D display may be realized by combining a display module; and meanwhile, the first floating electrode 44 and the second floating electrode 45 are grounded GND.

Figure 13:
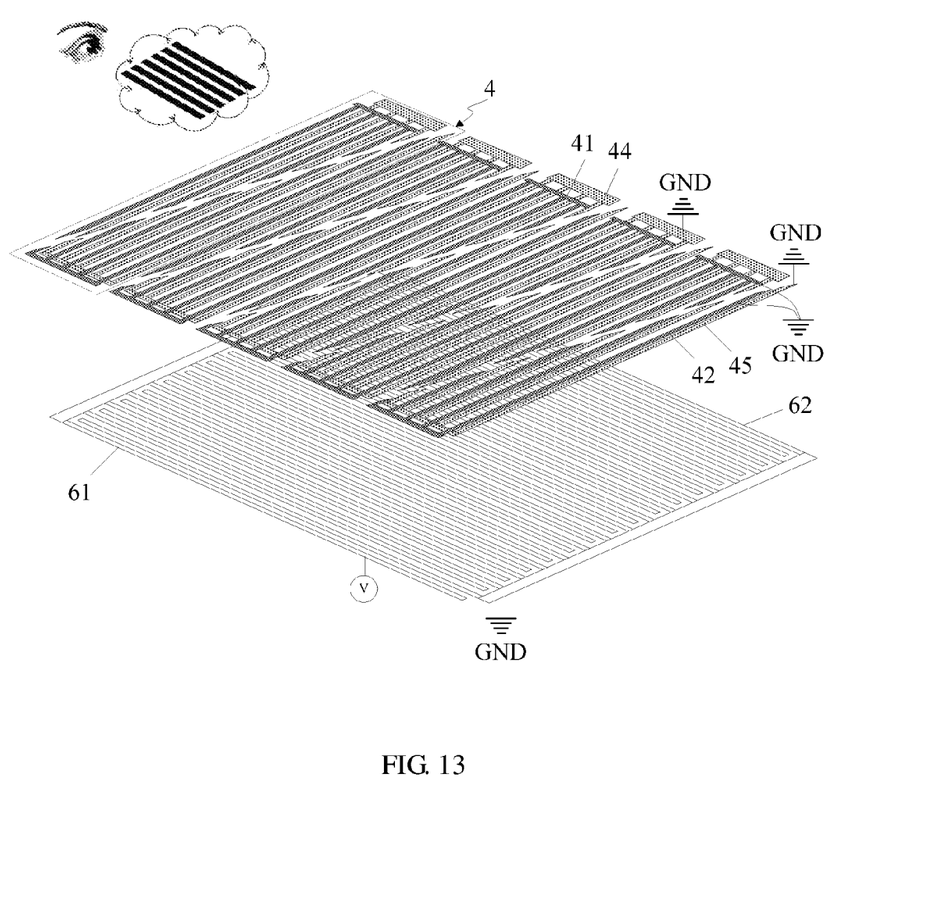
FIG. 13 is a schematic diagram of applying the second type liquid crystal grating provided by the embodiment of the present disclosure to a portrait 3D display.

As shown in FIG. 13, when the 3D touch display panel comprising the liquid crystal grating 101 is in a portrait 3D display, the first grating electrode 61 on the lower substrate 2 is grounded GND, a direct current voltage V (e.g., direct current common voltage) is input to the second grating electrode 62, the first touch electrode 41 and the second touch electrode 42 on the upper substrate 1 are grounded, and thus an electric field is formed between the touch electrode (e.g., the first touch electrode 41 and the second touch electrode 42) and the grating electrode 6 (e.g., the first grating electrode 61 and the second grating electrode 62), the liquid crystal layer 3 located between the upper substrate 1 and the lower substrate 2 deflects with respect to an original state as the presence of the electric field, a region where the electric field is vertically distributed may form a black region, to form a longitudinal black and white barrier, and the portrait 3D display may be realized by combining a display module; and meanwhile, the first floating electrode 44 and the second floating electrode 45 are grounded GND.

Figure 14:
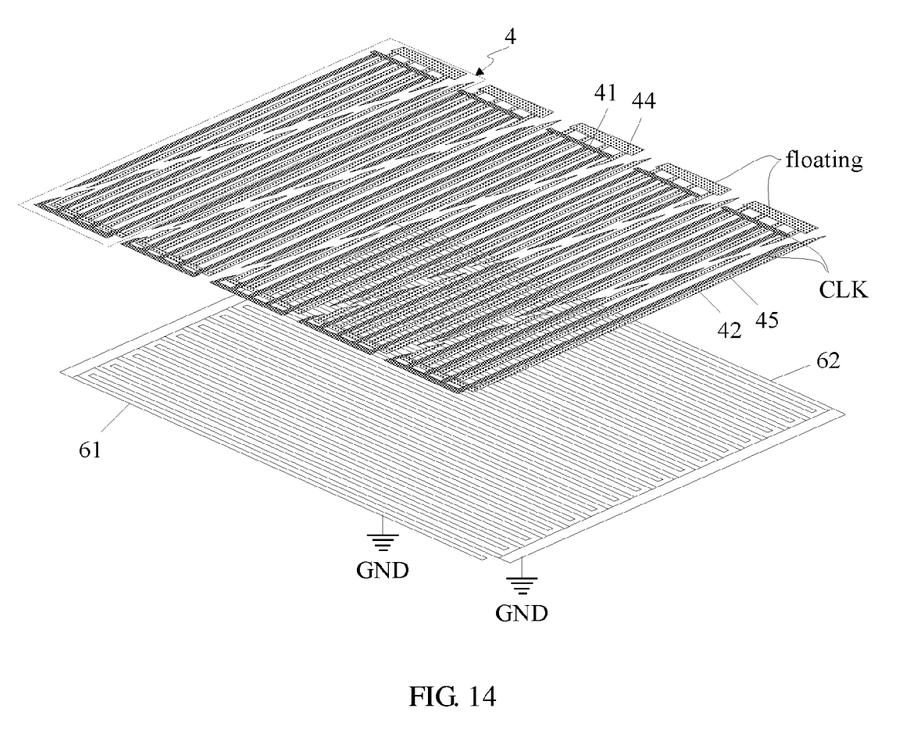
FIG. 14 is a schematic diagram of applying the second type liquid crystal grating provided by the embodiment of the present disclosure to touch.

As shown in FIG. 14, when the 3D touch display panel comprising the liquid crystal grating 101 is used to realize a touch function, the first grating electrode 61 and the second grating electrode 62 on the lower substrate 2 are grounded GND, touch detection signals CLK are received by the first touch electrode 41 and the second touch electrode 42 on the upper substrate 1, to sense a touch position in a manner of self-capacitive touch; and meanwhile, the first floating electrode 44 and the second floating electrode 45 are floated, so as to increase a signal-to-noise ratio between the first touch electrode 41 and the second touch electrode 42, thereby improving touch sensitivity.

In addition, when the 3D touch display panel comprising the liquid crystal grating 101 shown in FIG. 10 is in a 2D display, it is only necessary to ground all of the first grating electrode 61, the second grating electrode 62, the first touch electrode 41 and the second touch electrode 42, the first floating electrode 44 and the second floating electrode 45, which will not be repeated here.

Figure 15:
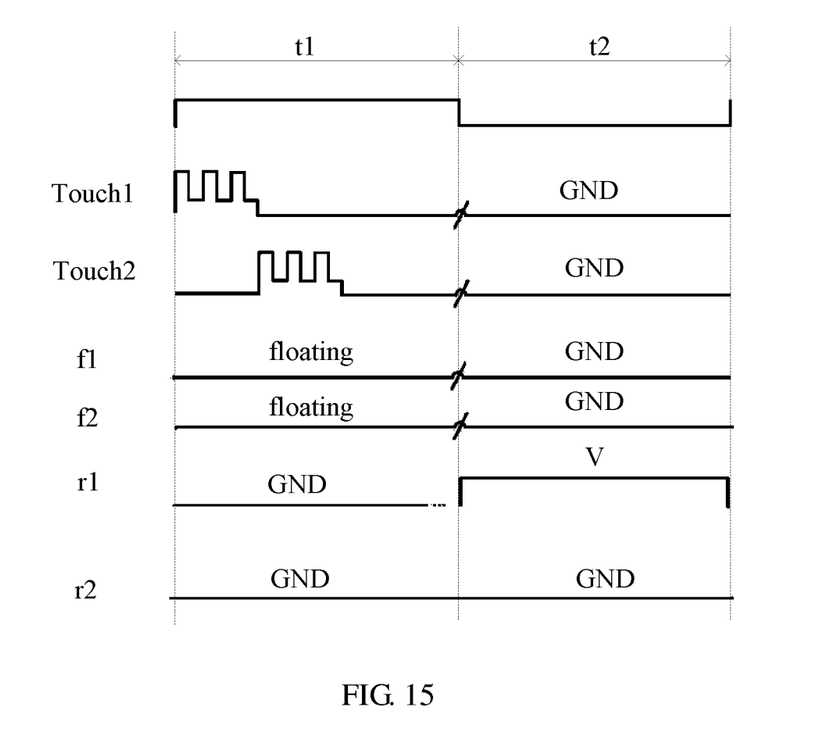
FIG. 15 is a time sequence diagram of applying the second type liquid crystal grating provided by the embodiment of the present disclosure to the landscape 3D display and the touch.

As shown in FIG. 15, there is a time sequence diagram of realizing a landscape 3D display and a touch function in a time serial manner; in conjunction with FIG. 14, the touch function is realized in a first time period t1, and touch detection signals CLK are received by the first touch electrode 41 and the second touch electrode 42, to realize a self-conductive touch function, for example, touch 1 and touch 2; the first floating electrode 44 and the second floating electrode 45 are floated, for example, f1 and f2; and the first grating electrode 61 and the second grating electrode 62 are grounded, for example, r1 and r2.

The landscape 3D display is realized in a second time period t2, the first touch electrode 41 and the second touch electrode 42 are grounded GND, for example, touch 1 and touch 2; the first floating electrode 44 and the second floating electrode 45 are grounded GND, for example, f1 and f2; the first grating electrode 61 is applied with a direct current voltage V, for example, r1; and the second grating electrode 62 is grounded, for example, r2.

It should be noted that, the first floating electrode 44 and the second floating electrode 45 may be combined and simplified, so that the floating electrode is a comb-shaped or grid-shaped electrode, a length of a comb tooth or a strip is equivalent to a length of the electrode group 4, and the comb teeth or the strips of the floating electrode and comb teeth of the first touch electrode 41 as well as the comb teeth of the second touch electrode 42 are parallel to each other and arranged at intervals, which are only variations of the first floating electrode 44 and the second floating electrode 45 shown in FIG. 10 and FIG. 11, which will not be repeated here.

Advantageous effects of the embodiment of the present disclosure are as follows: in the liquid crystal grating 101, a self-inductive touch electrode (e.g., the first touch electrode 41 and the second touch electrode 42) is formed on a surface of the upper substrate 1 facing the liquid crystal layer 3, a grating electrode 6 (e.g., the first grating electrode 61 and the second grating electrode 62) is formed on a surface of the lower substrate 2 facing the liquid crystal layer 3, so that the liquid crystal grating 101 is integrated with a touch function; when the liquid crystal grating 101 is applied to a 3D touch display panel, it is not necessary to arrange a touch panel separately, so that a thickness of the 3D touch display panel is reduced, and a transmittance is improved; and meanwhile, due to the arrangement of the first floating electrode 44 and the second floating electrode 45, a signal-to-noise ratio between the first touch electrode 41 and the second touch electrode 42 is increased, so as to improve touch sensitivity.

Embodiment III

Figure 16:
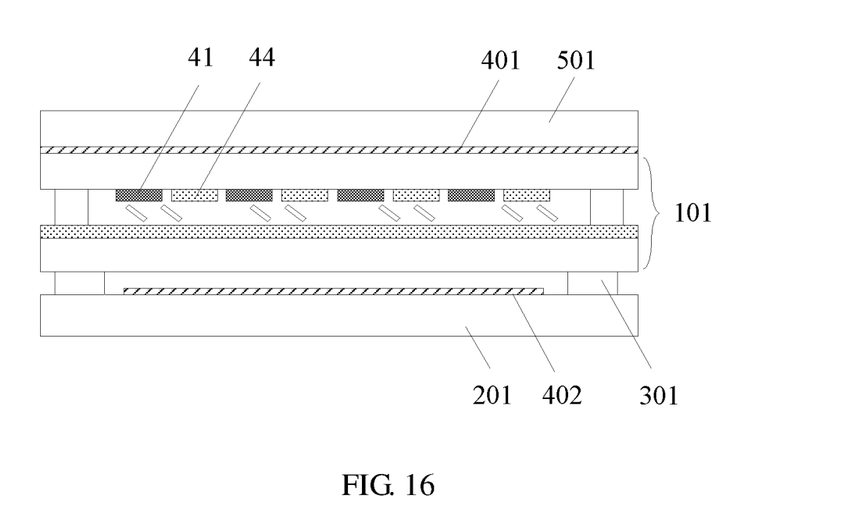
FIG. 16 is a cross-sectional structural schematic diagram of a 3D touch display panel provided by an embodiment of the present disclosure.

Referring to FIG. 16, an embodiment of the present disclosure further provides a 3D touch display panel, comprising a liquid crystal panel 201, and further comprising a liquid crystal grating 101 provided by the above embodiments, and the liquid crystal grating 101 is arranged above the liquid crystal panel 201, and adhered through an optical adhesive 301.

Exemplarily, the 3D touch display panel further comprises an upper polarizer 401 and a protective cover plate 501 arranged above the liquid crystal grating 101, sequentially, and a lower polarizer 402 arranged between the liquid crystal grating 101 and the liquid crystal panel 201.

Exemplarily, the liquid crystal grating 101 and the liquid crystal panel 201 may share a substrate, that is to say, a substrate of a color filter substrate of the liquid crystal panel may be used as a lower substrate of the liquid crystal grating 101, or a lower substrate of the liquid crystal grating 101 may be used as a substrate of a color filter substrate of the liquid crystal panel, and at that time, the lower polarizer 402 may be arranged in a light incident direction of the grating electrode 6.

It should be noted that, the embodiment is to obtain a 3D touch display panel in conjunction with the liquid crystal grating 101 provided by Embodiment II, the liquid crystal grating 101 in FIG. 16 only shows the first touch electrode 41 and the first floating electrode 44, however, it should be understood that, due to limitation to a range shown in the diagram, the diagram only uses the first touch electrode 41 and the first floating electrode 44 to represent a combination of the first touch electrode 41, the second touch electrode 42, the first floating electrode 44 and the second floating electrode 45.

Advantageous effects of the embodiment of the present disclosure are as follows: in the liquid crystal grating, a self-inductive touch electrode (e.g., the first touch electrode and the second touch electrode) is formed on a surface of the upper substrate facing the liquid crystal layer, a grating electrode 6 (e.g., the first grating electrode and the second grating electrode) is formed on a surface of the lower substrate facing the liquid crystal layer, so that the liquid crystal grating is integrated a touch function; when the liquid crystal grating is applied to a 3D touch display panel, it is not necessary to arrange a touch panel separately, so that a thickness of the 3D touch display panel is reduced, and a transmittance is improved.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The application claims priority of Chinese Patent Application No. 201510364627.X filed on Jun. 26, 2015, the disclosure of which is incorporated herein by reference in its entirety as part of the present application.

The invention claimed is:

1. A liquid crystal grating, comprising:
    an upper substrate;
    a lower substrate;
    a liquid crystal layer, arranged between the upper substrate and the lower substrate;
    a plurality of electrode groups which are strip-shaped, parallel to each other and arranged side by side, and formed on a surface of the upper substrate facing the liquid crystal layer, each of the electrode groups including a first touch electrode and a second touch electrode which are comb-shaped and separated by a strip-shaped region, comb teeth of the first touch electrode and the second touch electrode being opposite to each other, and an included angle between an extending direction of the strip-shaped region and an extending direction of the electrode group being larger than 0° and smaller than 90°; and
    a first grating electrode and a second grating electrode which are comb-shaped, formed on a surface of the lower substrate facing the liquid crystal layer, the first grating electrode and the second grating electrode being arranged in an interdigital shape;
    wherein each of the electrode groups further includes a floating electrode located in a same layer with the first touch electrode and the second touch electrode, the floating electrode including a first floating electrode and a second floating electrode which are comb-shaped and separated by the strip-shaped region;

in the same electrode group, the first floating electrode and the first touch electrode are located on a same side of the strip-shaped region, and comb teeth of the first floating electrode and the comb teeth of the first touch electrode are parallel to each other and arranged at intervals; and in the same electrode group, the second floating electrode and the second touch electrode are located on a same side of the strip-shaped region, and comb teeth of the second floating electrode and the comb teeth of the second touch electrode are parallel to each other and arranged at intervals.

2. The liquid crystal grating according to claim 1, wherein pitches of any two comb teeth of the first touch electrode are equal, and pitches of any two comb teeth of the second touch electrode are equal.

3. The liquid crystal grating according to claim 2, wherein, in a same electrode group, part or all of the comb teeth of the first touch electrode and the second touch electrode correspond to each other, and the comb teeth of the first touch electrode and the second touch electrode corresponding to each other are in a same straight line.

4. The liquid crystal grating according to claim 2, wherein the strip-shaped region is of a curve type, a polygonal line type or a straight line type.

5. The liquid crystal grating according to claim 3, wherein the strip-shaped region is of a curve type, a polygonal line type or a straight line type.

6. The liquid crystal grating according to claim 1, wherein the strip-shaped region is of a curve type, a polygonal line type or a straight line type.

7. The liquid crystal grating according to claim 6, wherein the strip-shaped region is of a straight line type, profiles of vertical projections of the first touch electrode and the second touch electrode on the upper substrate are of a triangle or trapezoid.

8. A 3D touch display panel, comprising:
a liquid crystal panel;
a liquid crystal grating according to claim 1, arranged in a light exiting direction of the liquid crystal panel and adhered to the liquid crystal panel through an optical adhesive; and,
an upper polarizer and a protective cover plate arranged in the light exiting direction of the liquid crystal panel, sequentially, and a lower polarizer arranged between the liquid crystal grating and the liquid crystal panel.

9. A control method of a liquid crystal grating, the liquid crystal grating comprising:
an upper substrate;
a lower substrate;
a liquid crystal layer, arranged between the upper substrate and the lower substrate;
a plurality of electrode groups which are strip-shaped, parallel to each other and arranged side by side, and formed on a surface of the upper substrate facing the liquid crystal layer, each of the electrode groups including a first touch electrode and a second touch electrode which are comb-shaped and separated by a strip-shaped region, comb teeth of the first touch electrode and the second touch electrode being opposite to each other, and an included angle between an extending direction of the strip-shaped region and an extending direction of the electrode group being larger than 0° and smaller than 90°; and a first grating electrode and a second grating electrode which are comb-shaped, formed on a surface of the lower substrate facing the liquid crystal layer, the first grating electrode and the second grating electrode being arranged in an interdigital shape;

the control method of the liquid crystal grating comprising:

when a 3D touch display panel comprising the liquid crystal grating operates in a landscape 3D display, grounding the first grating electrode and the second grating electrode on the lower substrate, and inputting direct current voltage to the first touch electrode and the second touch electrode on the upper substrate, so as to form a transverse black and white barrier;

when a 3D touch display panel comprising the liquid crystal grating operates in a portrait 3D display, grounding the first grating electrode on the lower substrate, inputting direct current voltage to the second grating electrode, and grounding the first touch electrode and the second touch electrode on the upper substrate, so as to form a longitudinal black and white barrier;

when a 3D touch display panel of the liquid crystal grating is used to realize a touch function, grounding the first grating electrode and the second grating electrode on the lower substrate, and receiving touch detection signals by the first touch electrode and the second touch electrode on the upper substrate, to sense a finger touch position in a manner of self-capacitive touch; and when a 3D touch display panel of the liquid crystal grating operates in a 2D display, grounding all of the first grating electrode, the second grating electrode, the first touch electrode and the second touch electrode.

10. A control method of a liquid crystal grating, the liquid crystal grating comprising:
an upper substrate;
a lower substrate;
a liquid crystal layer, arranged between the upper substrate and the lower substrate;
a plurality of electrode groups which are strip-shaped, parallel to each other and arranged side by side, and formed on a surface of the upper substrate facing the liquid crystal layer, each of the electrode groups including a first touch electrode and a second touch electrode which are comb-shaped and separated by a strip-shaped region, comb teeth of the first touch electrode and the second touch electrode being opposite to each other, and an included angle between an extending direction of the strip-shaped region and an extending direction of the electrode group being larger than 0° and smaller than 90°; and a first grating electrode and a second grating electrode which are comb-shaped, formed on a surface of the lower substrate facing the liquid crystal layer, the first grating electrode and the second grating electrode being arranged in an interdigital shape;

wherein each of the electrode groups further includes a floating electrode located in a same layer with the first touch electrode and the second touch electrode, the floating electrode including a first floating electrode and a second floating electrode which are comb-shaped and separated by the strip-shaped region;

in the same electrode group, the first floating electrode and the first touch electrode are located on a same side of the strip-shaped region, and comb teeth of the first floating electrode and the comb teeth of the first touch electrode are parallel to each other and arranged at intervals; and in the same electrode group, the second floating electrode and the second touch electrode are located on a same side of the strip-shaped region, and comb teeth of the second floating electrode and the comb teeth of the second touch electrode are parallel to each other and arranged at intervals;

the control method of a liquid crystal grating comprising:

when a 3D touch display panel comprising the liquid crystal grating operates in a landscape 3D display, grounding the first grating electrode and the second grating electrode on the lower substrate, and inputting direct current voltage to the first touch electrode and the second touch electrode on the upper substrate, grounding the floating electrode, so as to form a transverse black and white barrier;

when a 3D touch display panel comprising the liquid crystal grating operates in a portrait 3D display, grounding the first grating electrode on the lower substrate, inputting direct current voltage to the second grating electrode, grounding the first touch electrode and the second touch electrode on the upper substrate, grounding the floating electrode, so as to form a longitudinal black and white barrier;

when a 3D touch display panel comprising the liquid crystal grating is used to realize a touch function, grounding the first grating electrode and the second grating electrode on the lower substrate, receiving touch detection signals by the first touch electrode and the second touch electrode on the upper substrate, floating the floating electrode, to sense a finger touch position in a manner of self-capacitive touch; and when a 3D touch display panel comprising the liquid crystal grating operates in a 2D display, grounding all of the first grating electrode, the second grating electrode, the first touch electrode, the second touch electrode and the floating electrode.

* * * * *